United States Patent [19]
Balling

[11] Patent Number: 5,640,641
[45] Date of Patent: Jun. 17, 1997

[54] CAMERA COVER RELEASE MECHANISM

[75] Inventor: Edward Norman Balling, Rochester, N.Y.

[73] Assignee: Eastman Kodak Company, Rochester, N.Y.

[21] Appl. No.: 597,738

[22] Filed: Feb. 7, 1996

[51] Int. Cl.$^6$ .............................. G03B 17/02; G03B 17/04
[52] U.S. Cl. .......................... 396/535; 396/536; 396/541; 396/348
[58] Field of Search .................. 354/187, 191, 354/288; 396/439, 535, 536, 541, 348

[56] References Cited

U.S. PATENT DOCUMENTS

| | | | |
|---|---|---|---|
| 2,495,223 | 1/1950 | Bodlander | 95/11 |
| 3,256,793 | 6/1966 | Denk et al. | 95/11 |
| 3,299,931 | 1/1967 | Kritzler | 354/288 |
| 3,441,072 | 4/1969 | Schmitt | 354/288 |
| 4,032,940 | 6/1977 | Chan | 354/219 |
| 4,589,747 | 5/1986 | Nakayama et al. | 354/149.11 |
| 4,601,562 | 7/1986 | Yoneyama et al. | 354/170 |
| 4,890,130 | 12/1989 | Takei et al. | 354/288 |
| 4,961,085 | 10/1990 | Cho et al. | 354/288 |
| 5,126,775 | 6/1992 | Nakai et al. | 354/288 |
| 5,255,041 | 10/1993 | Lyon et al. | 354/288 |
| 5,313,240 | 5/1994 | Lyon et al. | 364/288 |
| 5,400,098 | 3/1995 | Rydelek | 354/288 |

*Primary Examiner*—Safet Metjahic
*Assistant Examiner*—Eddie C. Lee
*Attorney, Agent, or Firm*—Peter J. Bilinski; Robert Luke Walker

[57] ABSTRACT

A camera includes a lighttight body portion and a cover having an interior recess sized for receiving an end of said body portion. The cover is coupled to the body portion and is movable in opposing directions between an opened position and a closed position. A portion of the body or the cover includes stop surfaces for preventing the cover from opening beyond the opening position which are deformable or detachable to allow the cover to be released from the body portion of the camera. Alternately, the cover can be part of a two part releasable assembly which can be separated either destructively or non-destructively from the camera.

15 Claims, 14 Drawing Sheets

CAMERA COVER RELEASE MECHANISM

CROSS-REFERENCE TO RELATED APPLICATION(S)

Reference is made to commonly assigned copending applications Ser. No. 08/577,285, entitled: PUMP CAMERA filed in the names of Dennis R. Zander, David C. Smart, Thomas Dussinger, and Edward N. Balling, and Ser. No. 08/577,285, entitled: CAMERA COVER GUIDE MECHANISM, concurrently filed in the names of Edward N. Balling and David C. Smart, each of which are assigned to the assignee of this application.

FIELD OF THE INVENTION

The invention relates generally to the field of photography, and in particular to still photographic cameras. More specifically, this invention relates to the removal of a movably retractable cover from a lighttight camera body.

BACKGROUND OF THE INVENTION

Cameras are known in the field which include an actuating cover which is movable relative to a lighttight camera body portion between an opened and a closed position. The cover is coupled to the camera body portion and engages the film advancing mechanism as the cover is translated between the opened and the closed position to advance and meter a contained filmstrip for exposure by the user.

There are a number of reasons for requiring the removal of the above described actuatable cover from the lighttight camera body. One such reason is to allow access to the film cartridge chamber in order to remove the film cartridge from the confines of the camera body after all of the exposures have been taken. Typically, the film cartridge may be removed from the camera by either opening the film cartridge chamber door, or by opening the rear cover of the lighttight camera body. The presence of the coupled pump cover, however, may therefore prevent film cartridge removal. The removal of the film cartridge is applicable to literally any form of still photographic camera, including any having an actuatable cover as described.

Another reason, more applicable to so-called "single or one-time use" cameras which have recently evolved and are manufactured by the Eastman Kodak Company, and Fuji Photo Film Co., Ltd., among others, is for recyclability purposes, in order to access reusable photographic components, such as the film advancing mechanism and electronic flash assemblies, contained within the lighttight camera body section of the camera.

A competing concern, however, which is particular to the above referred to single-use cameras, is to avoid unauthorized reloading of film into the camera.

To that end, there is a need to remove the actuatable pump cover in a simple and efficient manner. There is a further need to remove the cover in a manner which promotes recyclability, in the case of recyclable cameras, such as the more recently evolved "single or one-time use" cameras while discouraging unauthorized reuse in the case of those covers used in single-use cameras.

It should be noted that these needs extend to other forms of covers which do not necessarily interact with the film advance mechanisms of the camera, and therefore are not actuatable. Such covers may include protective covers which are slipped over the lighttight camera body and used to encase and protect the body from damage.

SUMMARY OF THE INVENTION

The present invention is directed to overcoming one or more of the problems set forth above. Briefly summarized, according to one aspect of the present invention, there is provided a camera comprising a body portion; and a cover having an interior recess sized for receiving an end of said body portion, said cover being coupled to said body portion and movable in opposing directions between an opened position and a closed position, characterized by means for releasing said cover from the body portion to allow removal of the cover therefrom.

According to another aspect of the invention, there is provided a method of removing a translatable cover coupled to a camera body portion, said cover having an interior recess for covering at least one end of the body portion and an open end, and movable in opposing directions between an opened position and a closed position relative to the body portion, comprising the steps of:

i) translating the cover in one of the opposing directions to the opened position;

ii) applying force to an engagement member which prevents said cover from being translated beyond the opened position in the translating direction; and iii) translating the cover in the translating direction beyond the opened position until the cover is decoupled from the body portion of the camera.

An advantage provided by the present invention is that the actuatable cover and body portion of the camera can be designed to provide a feature which must be broken or damaged, to decrease the opportunity for unauthorized reuse of the camera, while still allowing the camera to be recycled.

Another advantage realized by the present invention is that the cover can also be constructed so as not to be functionally destroyed when the cover is removed, therefore also allowing the cover to be reusable. By making the cover reusable, there is a significant savings in the cost to recycle and manufacture the camera.

A further advantage of the present invention is that by making the cover removable, either destructively or non-destructively, allows the film cartridge to also be conveniently removable for the photofinisher, such as for the so-called "single or one-time use" cameras, or alternately for the photographer in conventional reusable cameras.

These and other aspects, objects, features and advantages of the present invention will be more clearly understood and appreciated from a review of the following Detailed Description of the Preferred Embodiments and appended claims, and by reference to the accompanying drawings.

DETAILED DESCRIPTION OF THE INVENTION

Figure 1A:
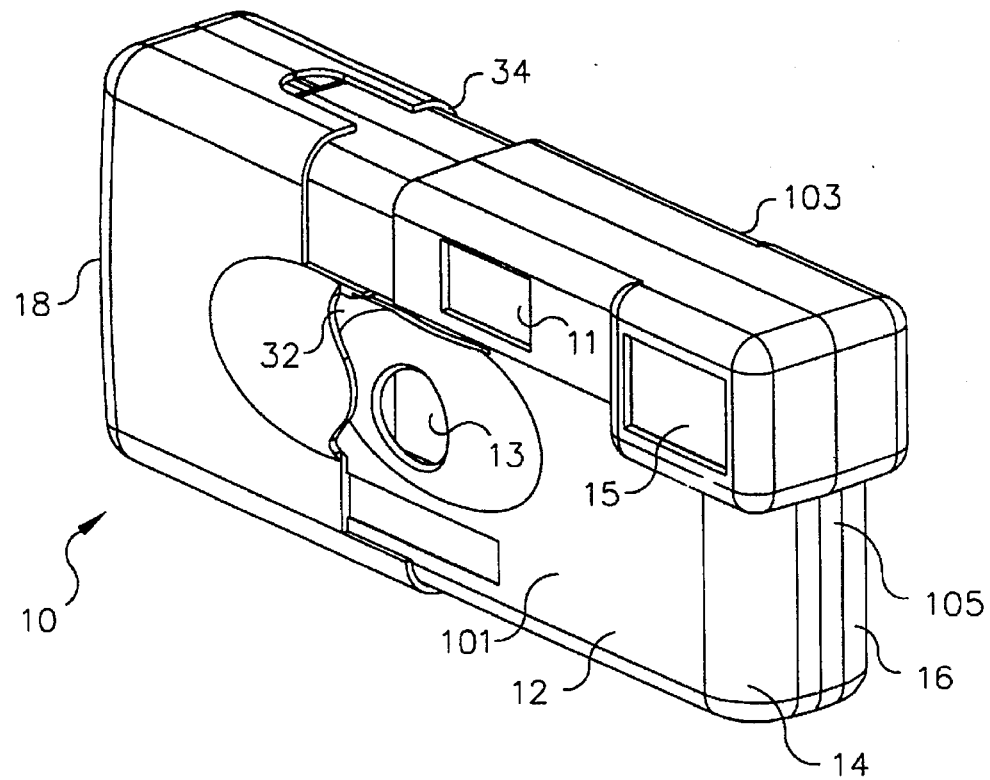
FIG. 1(a) is a front perspective view of a camera in accordance with the present invention showing a pump cover in a retracted position.

The following discussion describes a number of separate embodiments, each of which relate to a single or one-time use camera having a number of recyclable parts. It will become apparent from the following discussion, however, that the concepts of the present invention pertain to other forms of still photographic cameras. In addition, it will also be apparent that the concepts of the present invention apply to covers, such as lens covers and the like, which merely cover the lighttight camera body and do not necessarily interact with the film advance mechanism.

FIRST EMBODIMENT

A first embodiment is described with reference to FIGS. 1(a)–6. Beginning with FIGS. 1(a) and 1(b), there is shown a camera 10 made in accordance with a first embodiment of the present invention wherein a plastic injection-molded camera body 12 includes a front cover 14 and a rear cover 16 which sandwich a camera frame (not shown) and are secured together in a known manner to form a lighttight assembly. A translatably movable pump cover 18 is coupled to the camera body 12 so as to overlap an end portion of each of the assembled front and rear covers 14, 16, and is movable between an opened position and a closed position, shown in FIGS. 1(a) and 1(b), respectively.

The camera 10 includes a number of photographic components, such as a viewfinder 11, a taking lens 13, and an electronic flash assembly 15. The taking lens 13 faces forward and defines a forward portion 101, rear portion 103, and two side ends 105 of the camera body 12. Further, the camera body 12 contains respective chambers (not shown) for containing a film cartridge (not shown) and an unexposed film scroll (not shown) in opposite chambers relative to an exposure chamber (not shown). Each of the preceding elements are well known in the field of photography and require no further discussion that is essential to the workings of the present invention.

Figure 1B:
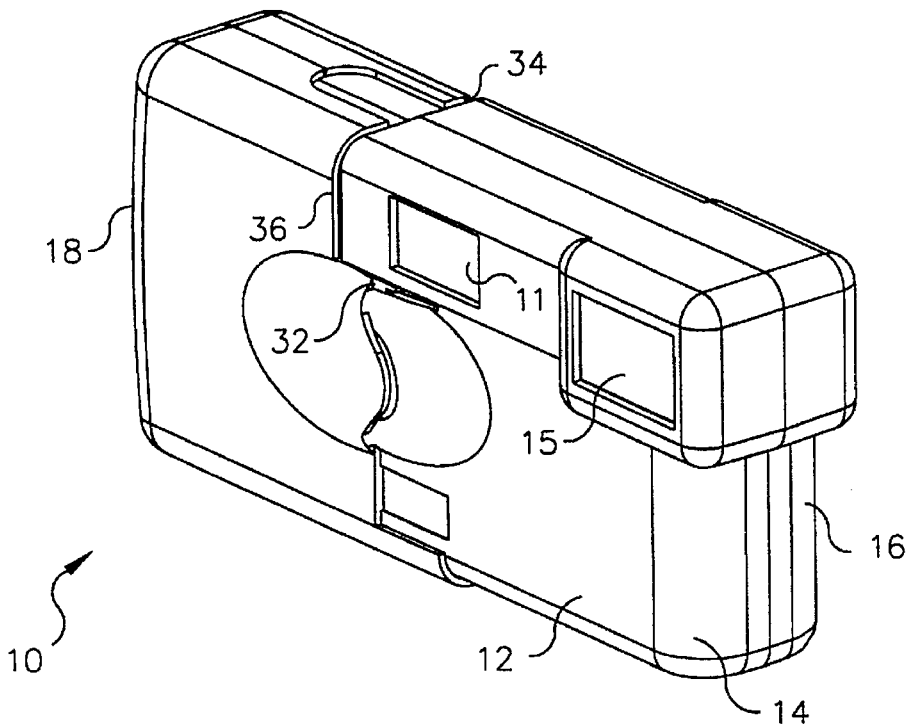
FIG. 1(b) is the front perspective view of FIG. 1, showing the pump cover in the closed position.

When the pump cover 18 is moved to the closed position, FIG. 1(b), the taking lens 13, and shutter release button (not shown) are each covered. Further, the movement of the cover between the opened and the closed positions causes an engagement arm 32 positioned on the interior of the front side of the cover 18 to engage the film advance system (not shown) of the camera 10 to advance and meter a contained filmstrip (not shown). The cooperation of the pump cover 18 with the film advance system of the camera 10 is described more completely in commonly assigned U.S. Pat. application Ser. No. 08/577,285, which is hereby incorporated by reference.

Figure 2:
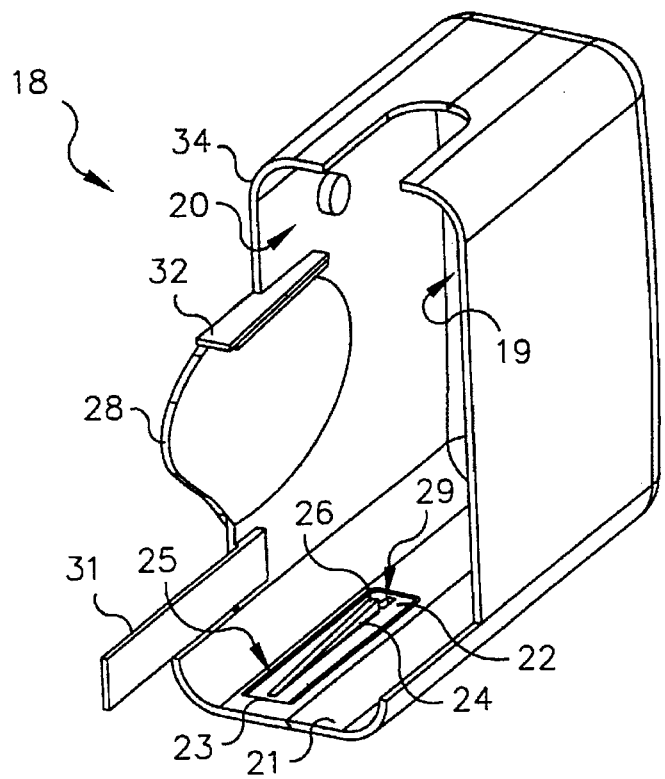
FIG. 2 is a rear perspective view of a pump cover according to a first embodiment.
Figure 3:
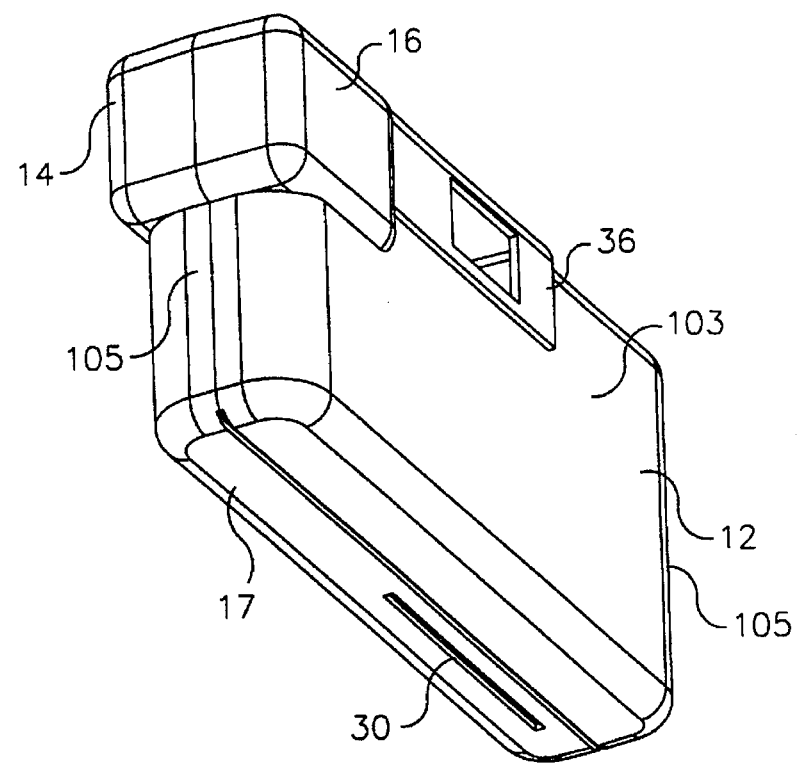
FIG. 3 is a partial rear perspective view of the camera body with the pump cover of FIG. 2 removed.

The translatable pump cover 18 according to this first embodiment is shown more particularly in FIG. 2, and along with the rear and front covers 14, 16, FIG. 1(b), is also a plastic injection-molded component including an interior recess 19 for fitting over an end portion of the assembled camera body 12, FIG. 3, and an open end 20. Molded into the bottom surface 21 of the pump cover 18 adjacent the open end 20 is a bendable tab portion 22 defined by a peripheral groove 25 surrounding the entirety of the tab portion with the exception of one end 23 to allow hinging.

The tab portion 22 itself includes a vertically extending projection 24 on the interior side of the pump cover 18 having a ramped profile that commences at the hinged end 23. The pump cover 18 is prevented from excessive movement in the opening direction beyond the opened position of FIG. 1(a), shown by arrow 27, FIG. 4, due to a stop surface 26 at the terminus of the ramped profile. A guide groove 30, FIG. 3, on the camera body portion 12, FIG. 3, is sized for retaining the vertical projection 24 when the cover 18 is coupled to the body portion, the end of which defines the opened position of the cover due to engagement with the stop surface 26.

A guide arm or member 31 is disposed adjacent the bottom of the pump cover 18 on the interior of a front side 23, beneath the above described engagement arm 32, each extending from the open end 20. As noted, the function of the engagement arm 32 particularly in connection with the film advance mechanism (not shown) of the camera 10, is more completely described in the previously incorporated U.S. Ser. No. 08/577,285. The function of the guide arm 31 is described in greater detail in copending and commonly assigned U.S. patent application Ser. No. 08/608,371, which is also incorporated by reference.

Referring now to FIG. 3, the bottom surface 17 of the assembled camera body portion 12 includes the guide groove 30 for retaining the vertically extending projection 24 of the tab portion 22 when the pump cover 18 is coupled thereto.

Figure 4:
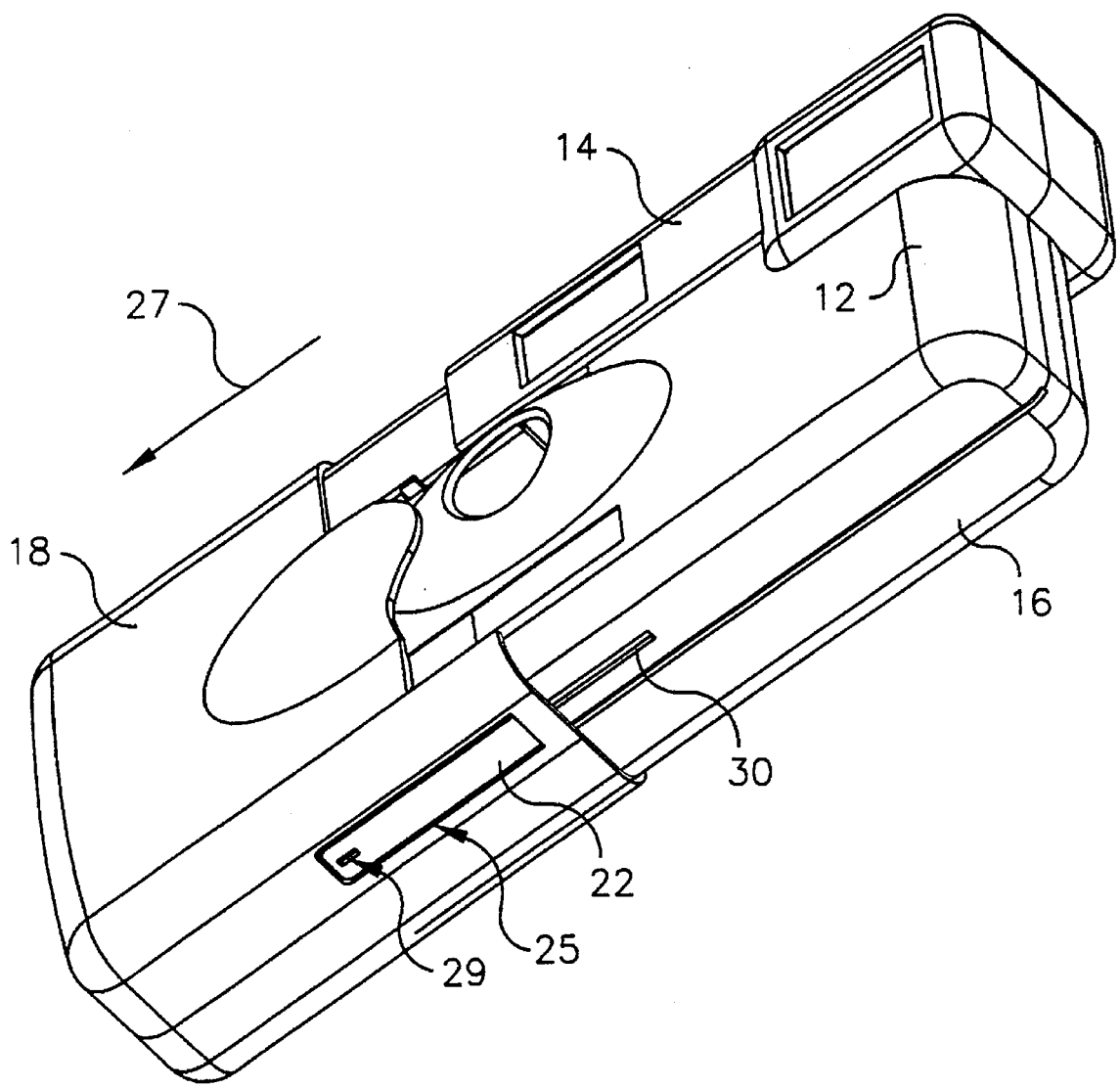
FIG. 4 is a bottom perspective view of the assembled pump camera of FIGS. 2 and 3.
Figure 5:
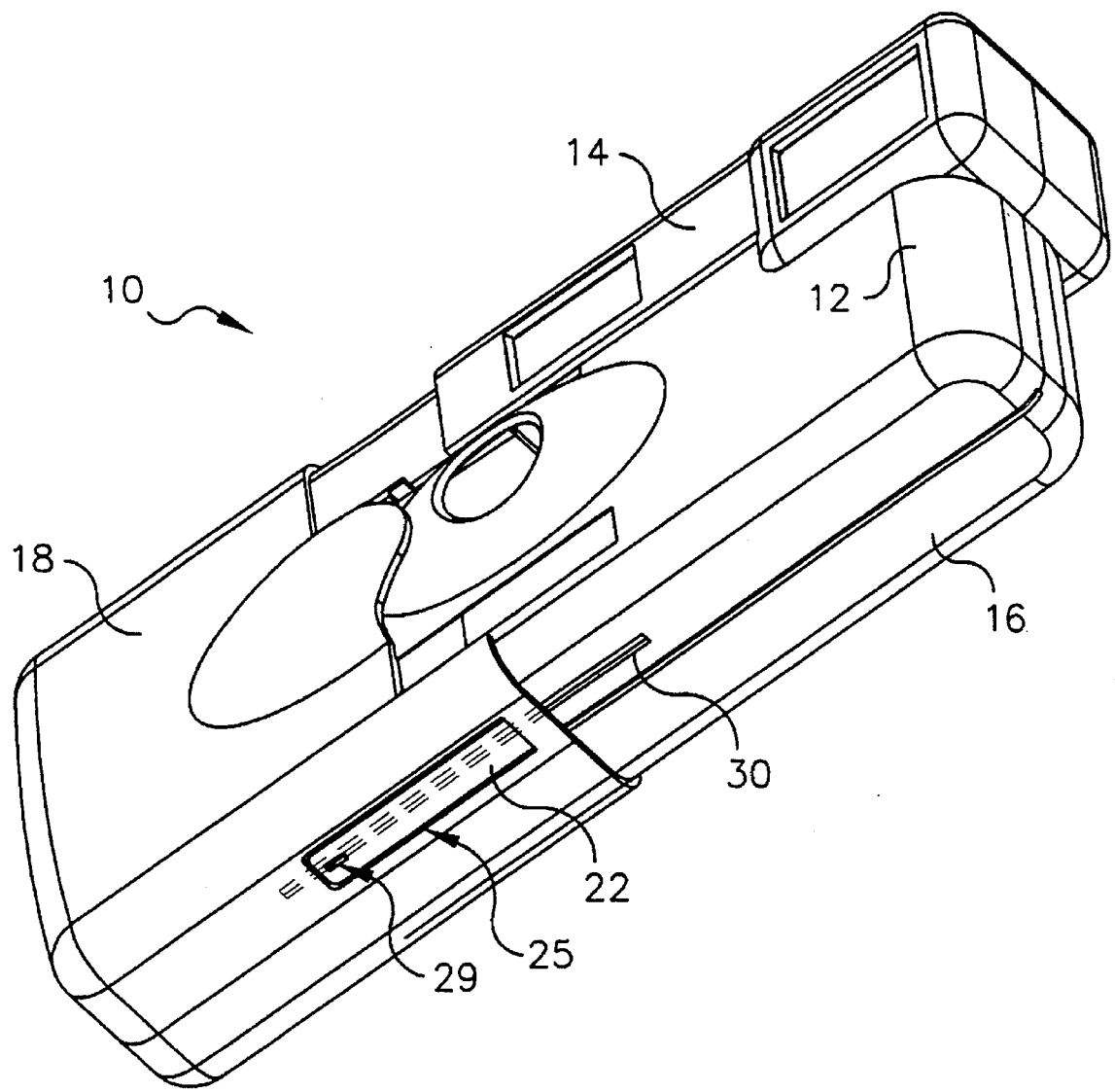
FIG. 5 is the bottom perspective view of FIG. 4 showing the relative engagement between the pump cover and the camera body.
Figure 6:
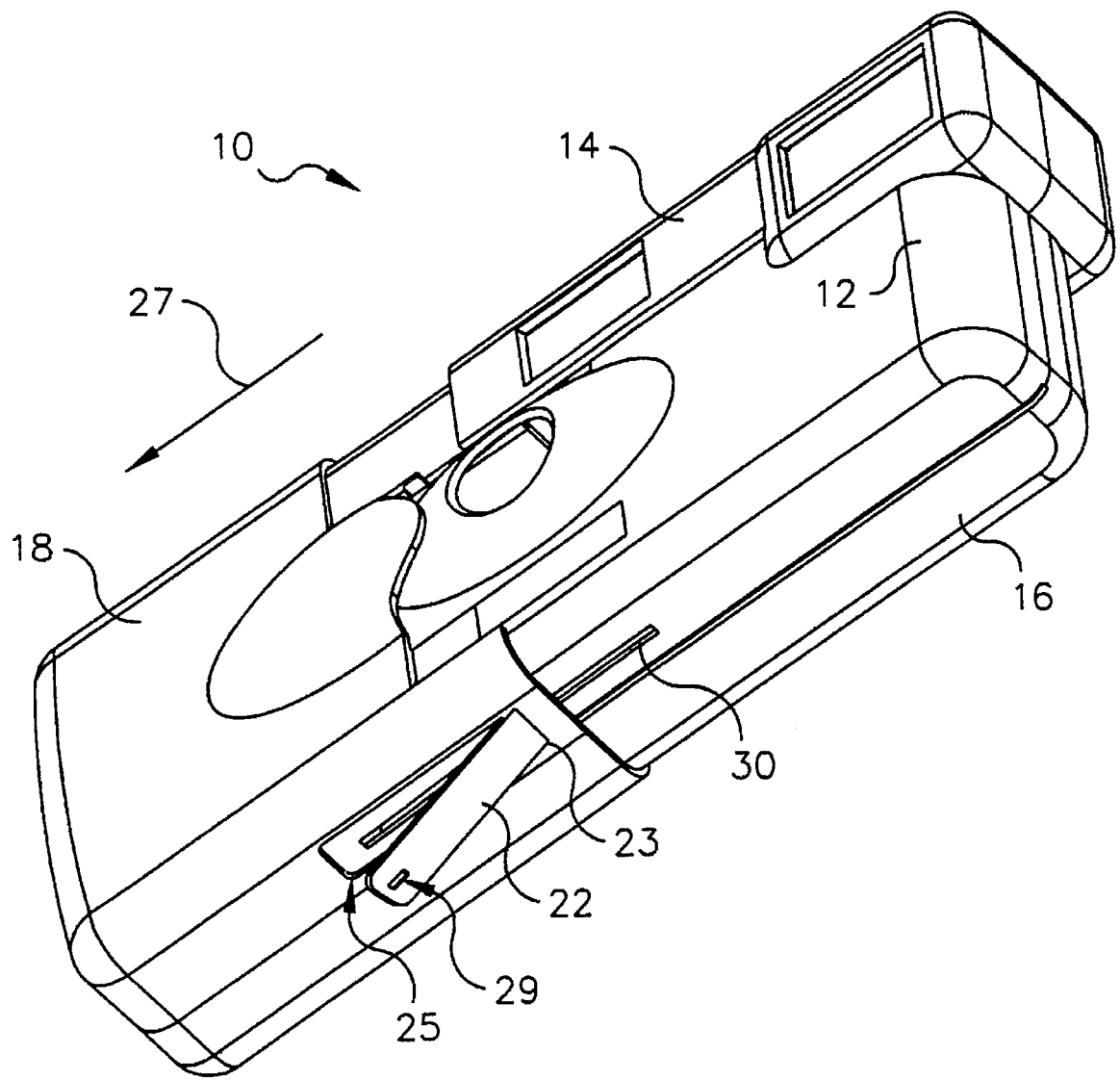
FIG. 6 is the bottom perspective view of FIG. 5 showing the removal of the pump cover from the camera body.

In the present embodiment, the removal of the pump cover 18 preferably takes place after all of the exposures of a contained filmstrip (not shown) have been taken. The removal operation is shown in FIGS. 4–6. As the pump cover 18 is moved in the opening direction, shown by arrow 27, the tab portion 22 is made bendable away from the camera body portion 12 by known means, such as using a finger pressure or preferably a tool, (not shown) such as a screwdriver, which is applied through a tool engagement hole 29 located adjacent the stop surface 26, FIG. 2, of the tab portion 22 and hinging the tab portion away from the interior of the camera about the end 23, as most particularly shown in FIG. 6. The displacement of the stop surface 26 away from the camera body portion 12, permits the pump cover 18 to be translated in the opening direction 27 beyond the opened position and allows the cover to be removed from the camera body portion 12 in a non-destructive manner.

SECOND EMBODIMENT

Figure 7:
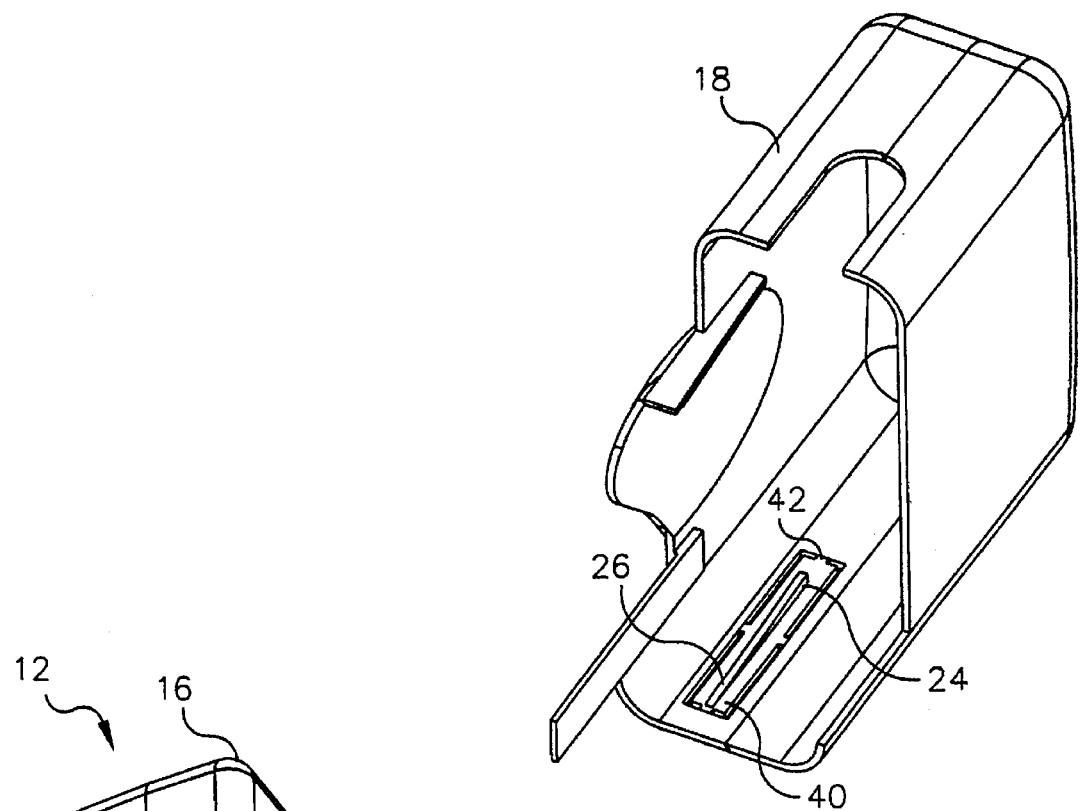
FIG. 7 is a side perspective view of a pump cover made according to a second embodiment of the present invention.
Figure 8:
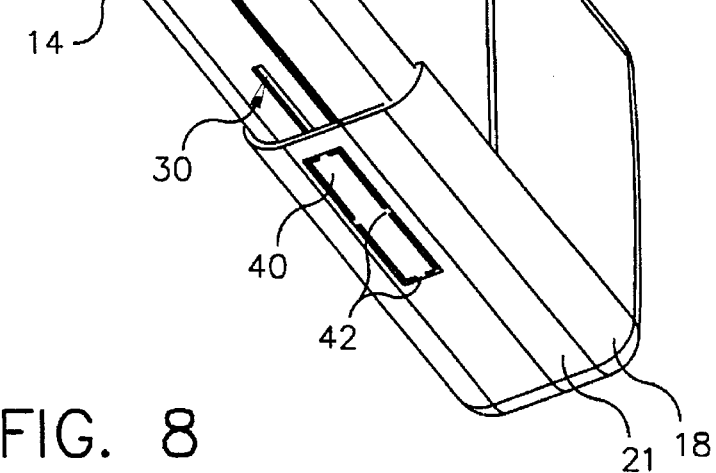
FIG. 8 is a bottom perspective view of the pump cover of FIG. 7 as assembled to a camera body.
Figure 9:
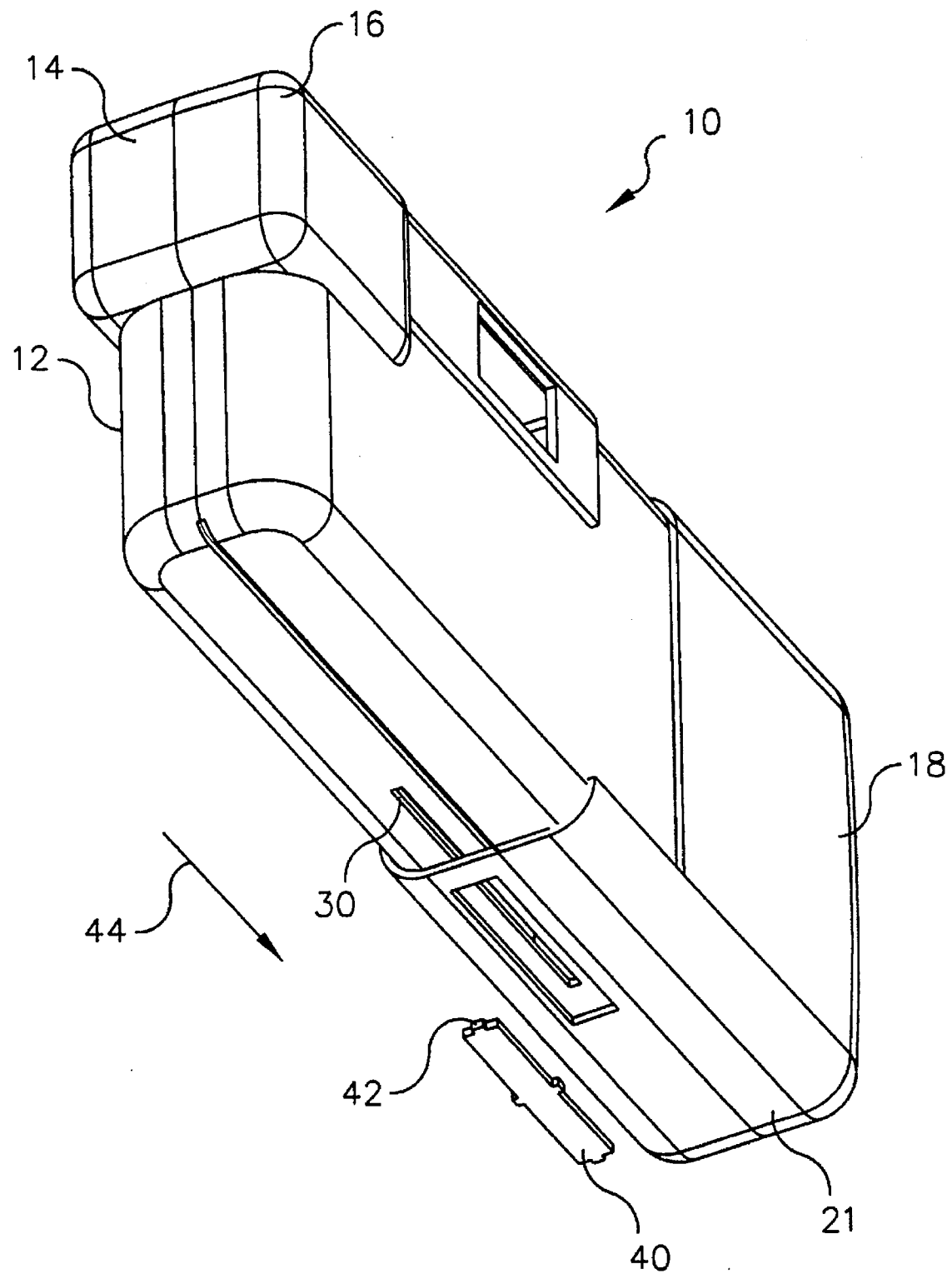
FIG. 9 is the bottom perspective view of FIG. 8, showing the removal of the pump cover from the camera body.

As shown in FIGS. 7–9, a second embodiment of the present invention illustrates that the above described tab portion 22, FIG. 6, can be made separately removable or breakable relative to the pump cover 18, as opposed to being bendable. Similar parts are denoted with the same reference numerals for the sake of clarity.

Referring to FIGS. 7 and 8, the pump cover 18 of this embodiment is entirely similar to that previously described in the first embodiment with the exception that the tab portion 40 attached to the bottom surface 21 of the pump cover 18 includes four equally spaced breakaway insets 42, one on each side of the tab portion in lieu of the peripheral groove 15, FIG. 2, and hinged end 23, FIG. 2. The tab portion 40 is coplanar with the bottom surface 21 and includes an interior extending projection 24, similar to that previously described, having a stop surface 26 which engages a guide groove 30 located on the bottom surface 17 of the camera body portion 12 to prevent movement of the cover in the opening direction, arrow 44, beyond a predetermined opened position as dictated by the length of the guide groove.

In operation, and referring to FIG. 9, a tool (not shown) can be used to break the tab portion 40 at each of the breakaway insets 42 to remove the tab portion 40 from the bottom surface 21 of the pump cover 18. With the tab portion 40 removed as shown, the cover 18 can be removed from the camera body 12 by translating the cover in the opening direction, shown by arrow 44. The absence of the stop surface 26 allows the cover 18 to be removed from the camera body portion 12.

After removal, the pump cover 18 can be placed over a camera body portion 12, but will not function efficiently because the tab portion 40 has been removed from the bottom surface 21, therefore discouraging possible unauthorized reloading and reuse of the camera with a used cover.

Though the tab portions of each of the preceding embodiments have been shown on the bottom surface 21 of the pump cover 18, it should be readily apparent that other configurations and positions can easily be imagined.

THIRD EMBODIMENT

A third embodiment of the present invention is shown in FIGS. 10–14. As in the preceding embodiment, similar parts are denoted by the same reference numerals for the sake of clarity.

Figure 12:
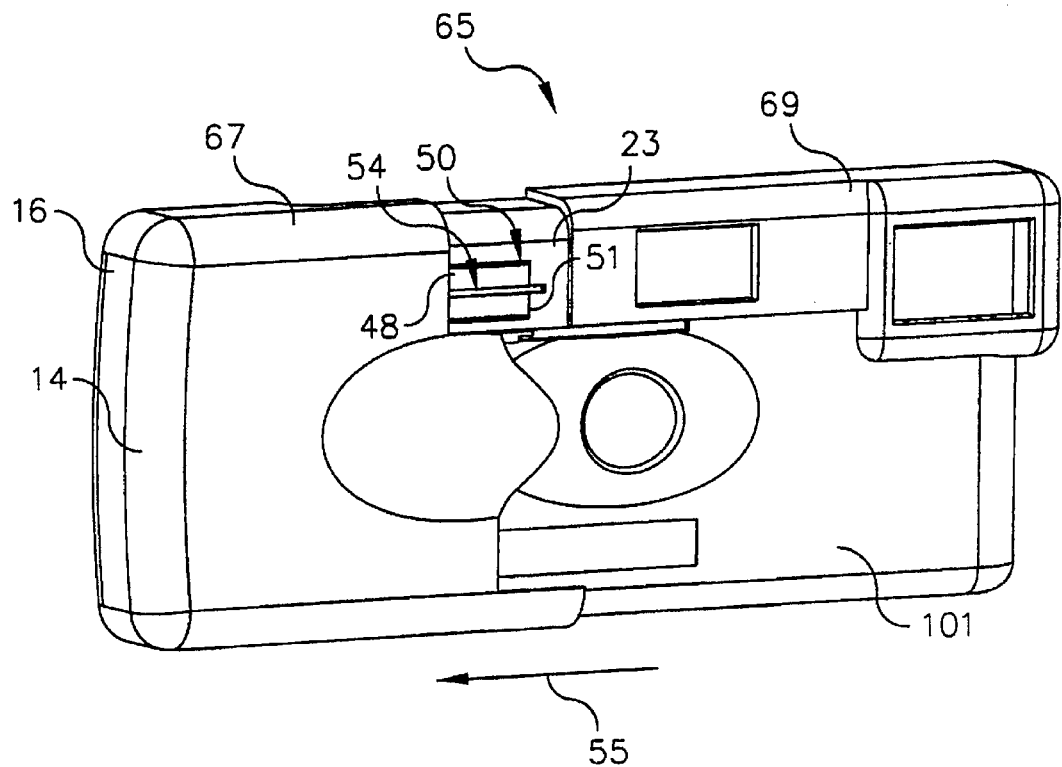
FIG. 12 is a front view of the camera of FIG. 11 showing the pump cover in the opened position.

In this embodiment, an assembled camera 65 is shown in FIG. 12 having a pump cover 67 coupled to a lighttight body portion 69. The pump cover 67 is similar to that previously described, that is having an interior recess and an open end for fitting over an end portion of the lighttight body portion 69 and being movable relative to the body portion between an opened position and a closed position. Further, the cover 67 like those of the preceding embodiments includes an engagement arm 32 for engaging the film advance system of the body portion 69 when the cover is moved between the opened and the closed positions. The pump cover 65 is shown in the opened position in FIG. 12.

Figure 11:
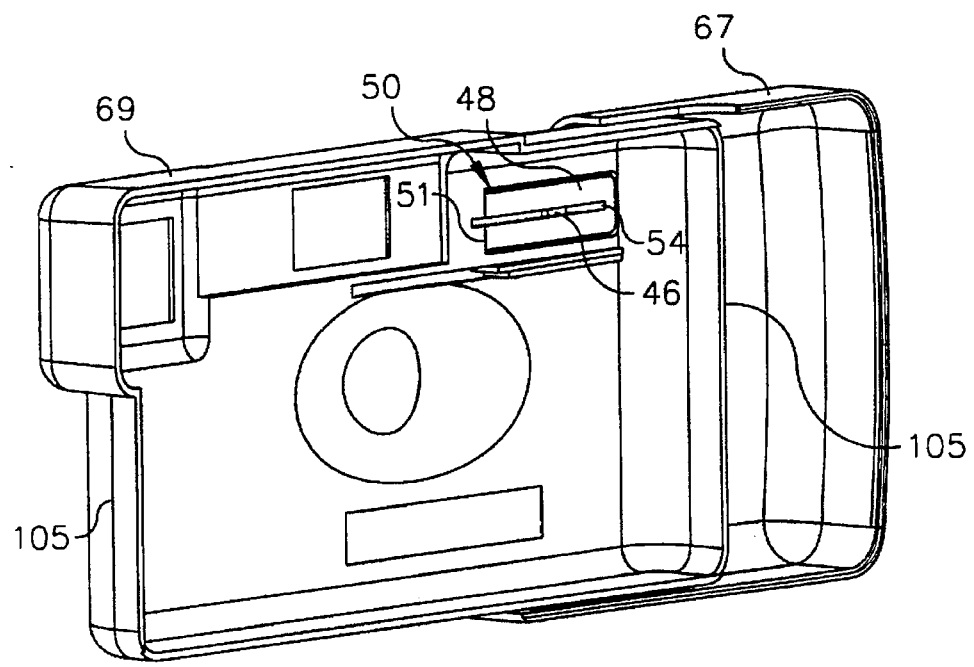
FIG. 11 a partial rear cutaway view of the pump cover of FIG. 10 as assembled to a camera body.

Referring to FIGS. 11 and 12, the camera body section 69 is also similar to those previously described being constructed of molded front and rear covers 14, 16 which sandwich a camera frame (not shown) having attached thereto a number of known photographic components, including the film advance system (not shown). An example is more completely described in the cross-referenced 72240 application.

Figure 10:
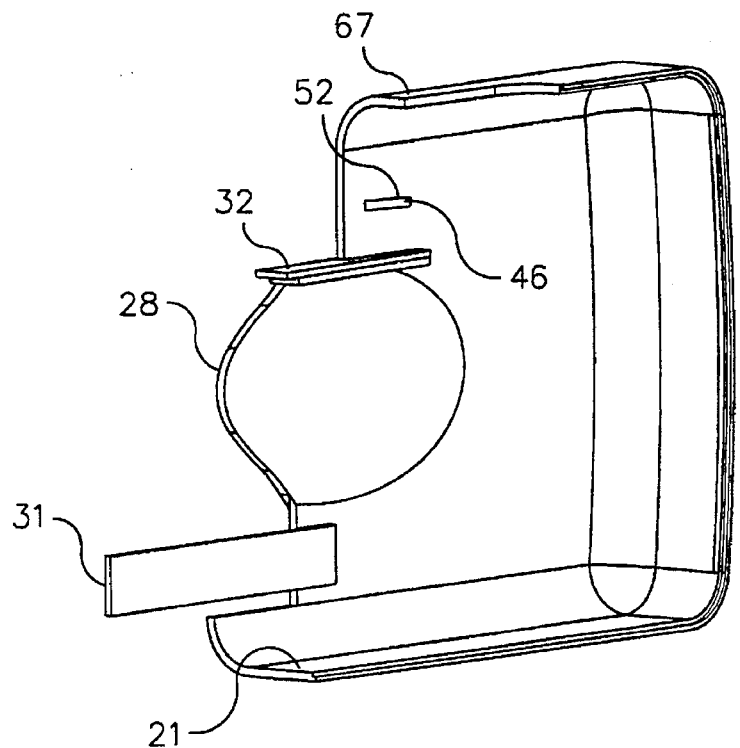
FIG. 10 is a partial rear cutaway view of a pump cover made in accordance with a third embodiment of the present invention.

Referring now to the partial views of the cover 67 and the body portion of FIGS. 10 and 11, and rather than providing a tab portion on the bottom of the cover as described in the previous two embodiments, a ramped projecting locking tab 46 is provided on the interior of the front surface 28 of the pump cover 67 for engaging a longitudinal groove 54 correspondingly located on the front side 23 of the camera body portion 69. The longitudinal groove 54 is located in the center of a bendable guide portion 48 defined by a peripheral groove 50 extending about each side of the guide portion with the exception of one end 51, to allow hinging. The projecting locking tab 46 includes a stop surface 52 which prevents the coupled cover 67 from being opened beyond the opened position in the direction shown by arrow 55, FIG. 12 which is defined by the end of the longitudinal groove 54.

Figure 13:
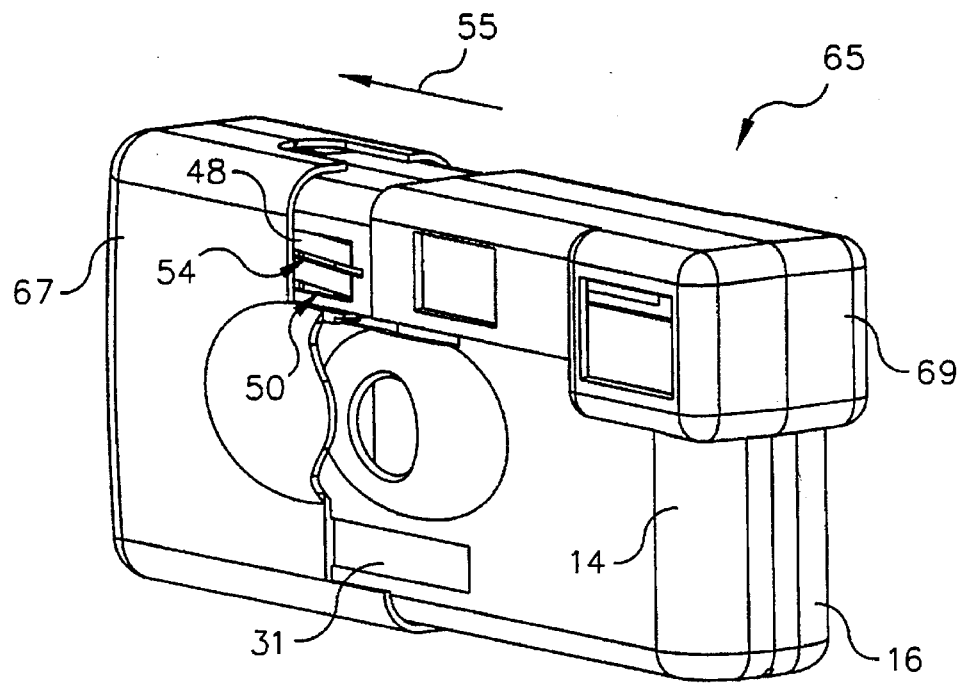
FIG. 13 is a front perspective view of the camera of FIG. 12 showing the removal of the pump cover from the camera body.
Figure 14:
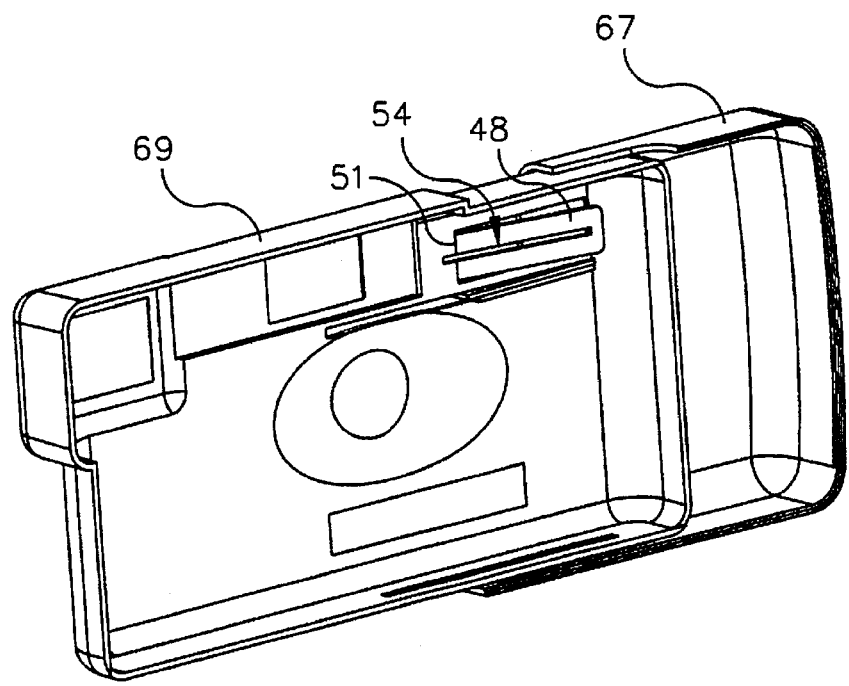
FIG. 14 is the partial rear cutaway view of FIG. 11 showing the removal of the pump cover from the camera body.

The removal of the pump cover 67 is herein described with reference to FIGS. 12–14. Application of an inwardly directed force is used; that is, a force directed toward the interior of the camera 65, to pivot the bendable guide portion 48 about the hinged end 51, and move the longitudinal groove 54 out of engagement with the projecting locking tab 46. The pump cover 67 is then unencumbered from additionally translating in the opening direction 55, non-destructively releasing the cover from the camera body portion 69.

As should be readily apparent, the respective positions of the guide portion and ramped locking projecting tab should not be limited to those defined herein. That is, other positions can be realized to effect release of the pump cover 67.

FOURTH EMBODIMENT

Figure 17:
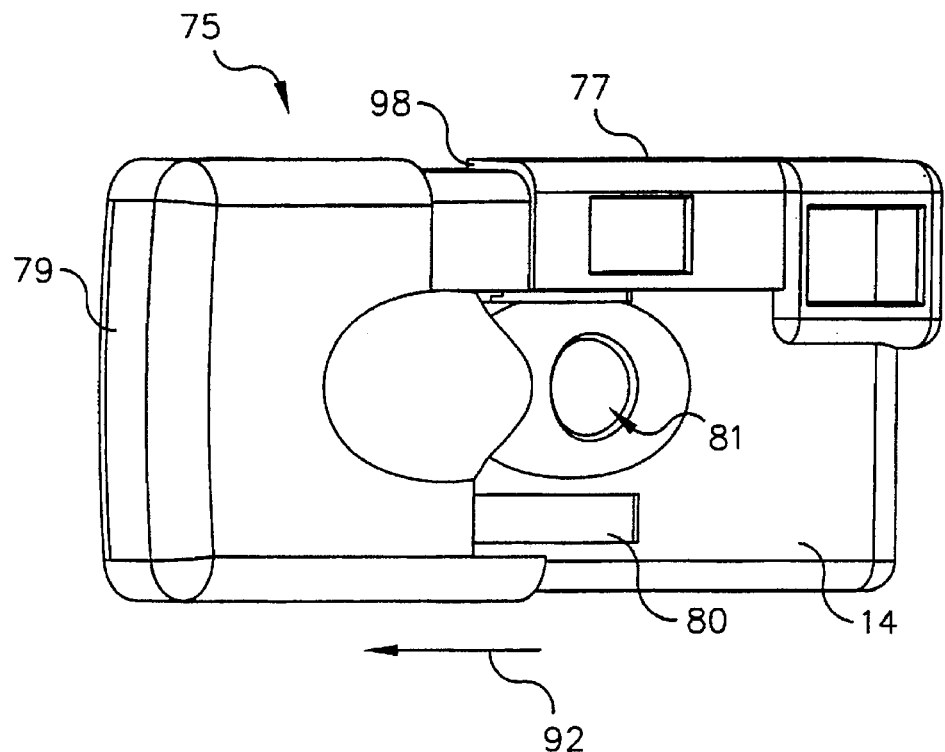
FIG. 17 is a front view of a pump camera made in accordance with a sixth embodiment of the present invention.
Figure 18:
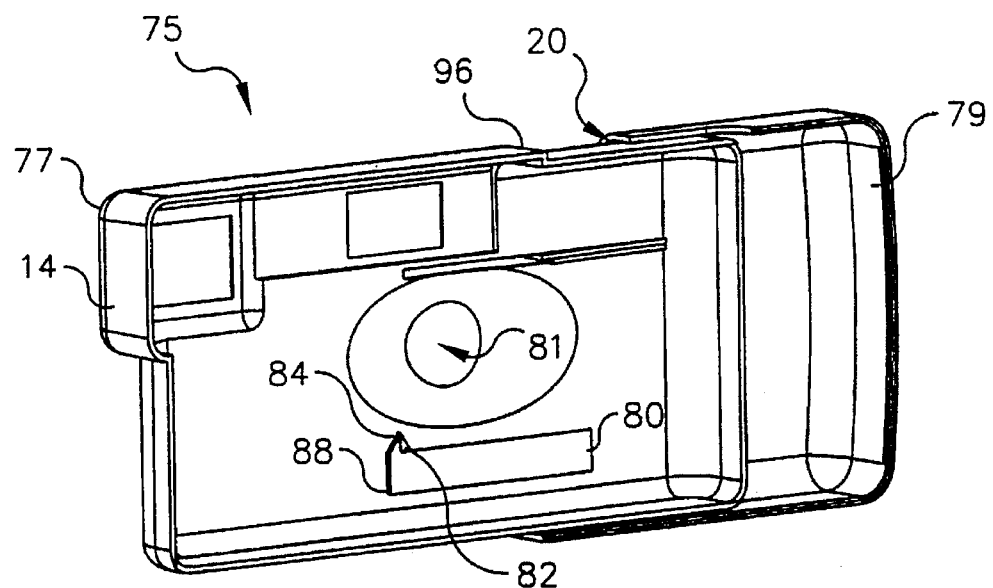
FIG. 18 is a partial cutaway rear view of the camera of FIG. 17 showing the engagement of the pump cover relative to the camera body.
Figure 19:
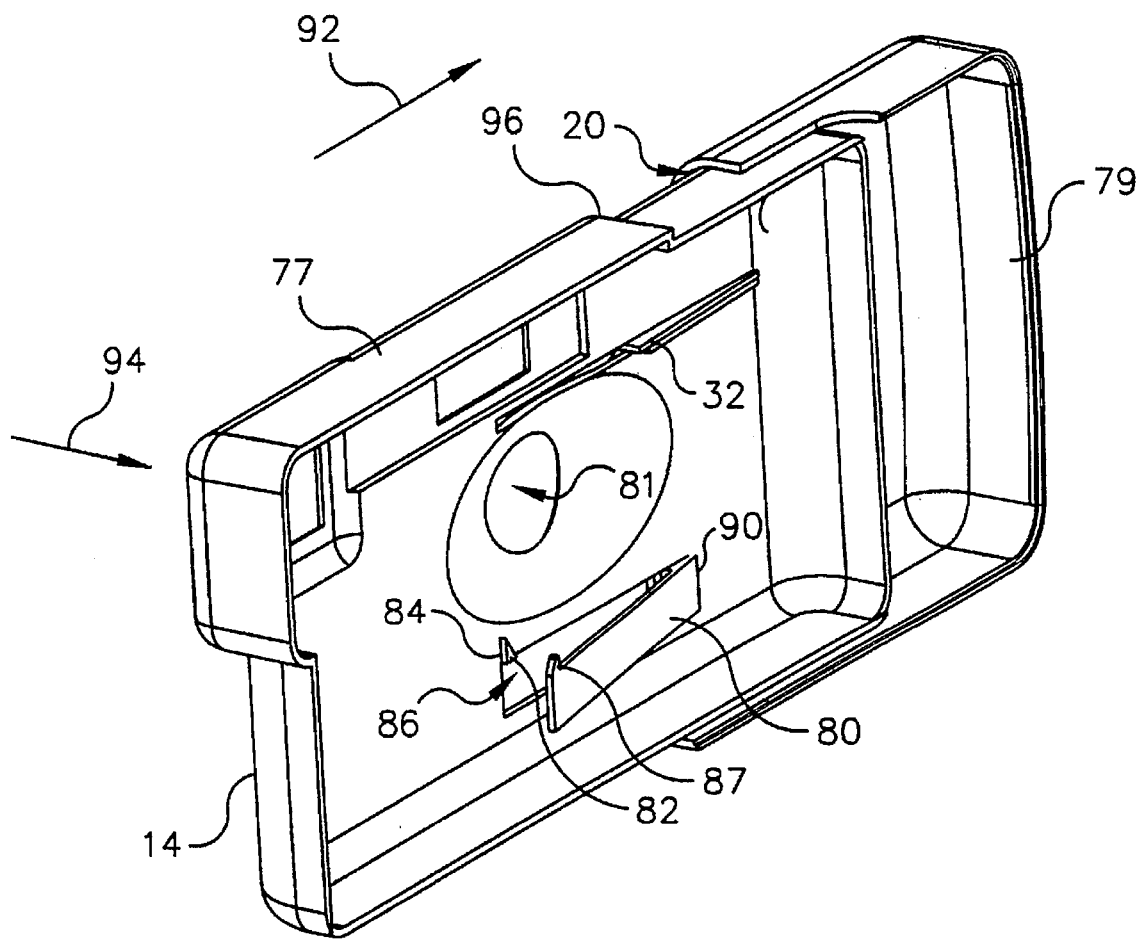
FIG. 19 is the partial rear cutaway view taken in perspective showing the removal of the pump cover from the camera body.

A fourth embodiment of the present invention is shown in FIGS. 17–19. As in the preceding, similar parts are denoted with the same reference numerals for the sake of clarity.

Referring to FIG. 17, there is shown a camera 75, shown in part, having a camera body portion 77 and a translatable pump cover 79, each similar to those previously described. The pump cover 79 includes an open end and an interior recess which is sized to cover an end of the camera body portion 77, the cover being movable between an opened position and a closed position relative to the camera body portion. The pump cover 79 is shown in the opened position in the partial view of FIG. 17.

The camera body portion 77 includes molded front and rear covers 14, 16 as previously described which are assembled by known means and sandwich a camera frame (not shown) containing a number of known photographic components to form a lighttight assembly.

Referring to FIGS. 18 and 19, partial cutaway views are provided of the interior of the pump cover 79 and the camera body portion 77 to more clearly show the workings of the invention. Located on the interior of the front cover 14 of the camera body portion 77 and beneath the taking lens opening 81 is a ramped projecting tab 82 having a triangular or other convenient shape, including a stop surface 84. A rectangular slot 86 is provided in the front cover 14 which extends longitudinally across the assembled front cover and is sized to retain a guide arm or member 80 extending from the open end 20 of the pump cover 79. The guide member 80 includes a locking portion 87 at its cantilevered end 88 for engaging the stop surface 84 of the ramped projecting tab 82 of the camera body portion 77 when the pump cover 79 is translated to the opened position, as shown in the cutaway view of FIG. 18 and is hinged from the remaining end 90.

In passing, it should be noted that the rectangular slot 86 is positioned so as not to affect the lighttight integrity of the camera body portion 77.

When coupled to the camera body portion 77, the pump cover 79 is prevented from movement in the opening direction, shown by arrow 92, beyond the opened position of FIG. 17, which is defined by the engagement of the stop surface 84 located adjacent the end of the rectangular slot 86 with the locking portion 87 of the guide member 80, as shown in the cutaway view of FIG. 18. In order for the described engagement to occur, the guide member 80 is initially bent inwardly and is accommodated into the rectangular slot 86. The pump cover 79 is restricted from movement in the opposite closing direction (not shown) by engagement of the open end 20 of the cover with a stop surface 96 of the camera body portion 77.

The pump cover 79 is released from the camera body portion 77 by applying a deflecting force onto the guide member 80 in a direction 94 toward the interior of the camera 73, as most clearly shown in FIG. 19 using finger pressure, or other known means, and translating the cover in the opening direction 92. The guide member 80, being hinged at the end 90 is free to bend inwardly, thereby breaking the contact between the stop surface 84 and the locking portion 87. The pump cover 79 is then unrestricted in the opening direction 92 and is allowed to translate beyond the opening position, allowing removal of the cover.

FIFTH EMBODIMENT

Figure 15A:
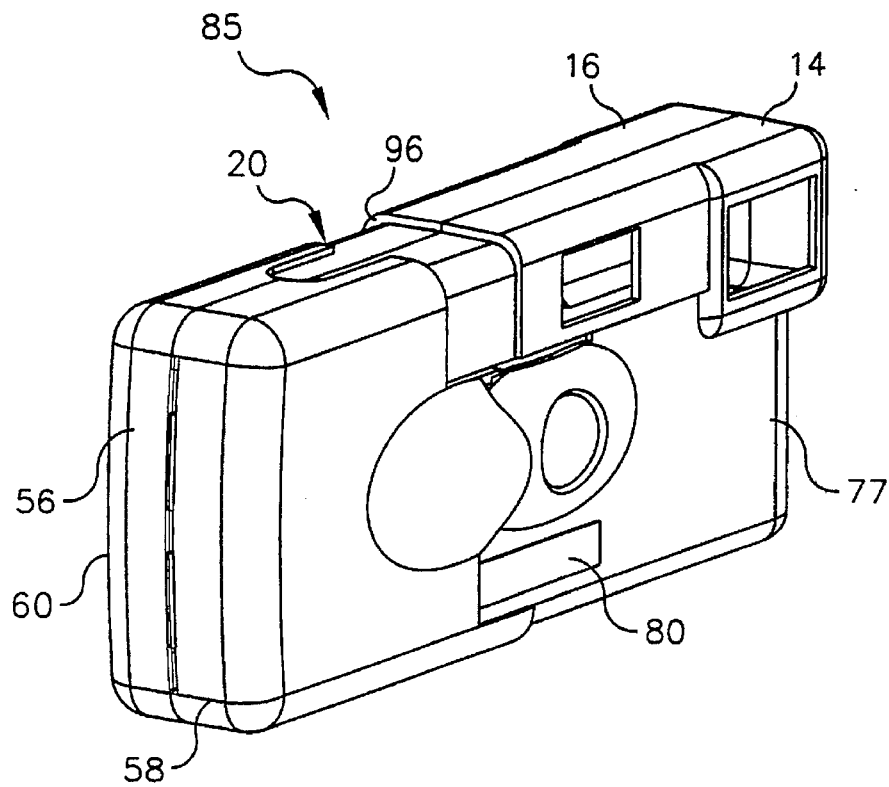
FIG. 15(a) is a front perspective view of a pump camera made in accordance with a fourth embodiment of the present invention.
Figure 15B:
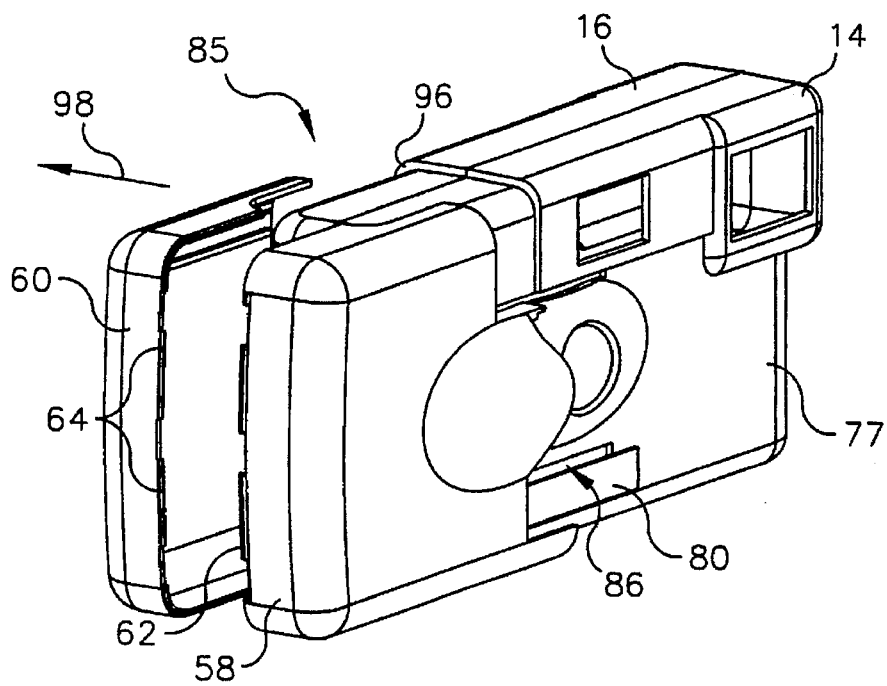
FIG. 15(b) is the front perspective view of FIG. 15(a) showing the removal of the pump cover from the camera body.

A fifth embodiment of the present invention is shown with reference to FIGS. 15(a)-15(b). As in the preceding embodiments, similar parts are denoted by the same reference numerals for the sake of clarity.

The preceding discussion related to features molded into either the pump cover and/or the body portion which are engageable to allow the cover to be opened beyond the opened position in the opening direction. In this embodiment, however, rather than providing a pump cover having a bendable or breakable tab portion, the pump cover 56 is an assembled component consisting of a front half section 58 and a rear half section 60 which are made to be separable.

The camera body portion 77 is like that of the fourth embodiment described above being assembled by known means of molded front and rear covers 14, 16 which sandwich a camera frame (not shown). The body portion includes a rectangular slot 86 in the front cover 14 for accommodating a guide member 80 extending from the open end 20 of the front half section 58 of the pump cover 56. The guide arm or member 80 is cantilevered, as previously described and when the pump cover 56 is assembled to the camera body portion 77, the guide member is guided into the slot or engagement surface 86, FIG. 15(b).

When assembled to form the camera 85, as shown in FIG. 15(a), the pump cover 56 overlaps the body portion 77 of the camera and is movable between the opened and closed positions. The pump cover 56 is shown in the opened position in FIG. 15(a). The pump cover 56 is restricted from movement in the closing direction by engagement of the open end 20 of the cover with a stop surface 96 located on the top of the camera body portion. The pump cover 56 is also restricted from movement in the opening direction according to this embodiment by the engagement of the locking portion 87, FIG. 19, of the guide member 80 with an interior projecting tab 82, FIG. 19, adjacent the slot 86 of the front cover 14, though other means, such as the bendable or breakable tab portions described above or other known means, such as other stop surfaces (not shown) on the body portion 77 or the cover 56 can be utilized.

Referring more specifically to FIG. 15(b), the rear half section 60 of the pump cover 56 includes a series of end grooves or slots 64 for receiving corresponding releasable snap hook portions 62 extending from the interior periphery of the front half section 58, though other known means for releasably attaching the front and rear half sections can be utilized.

Disengagement of the releasable snap hook portions 62 from the end grooves 64 of the rear half portion 60, allows the rear half section to be directly removed from the camera 85, in the direction 98 and also allows the front half section 58 to be released in that the separation of the front and rear half sections removes any constraining forces on the front half section 58 with the lighttight camera body portion 77.

SIXTH EMBODIMENT

Figure 16C:
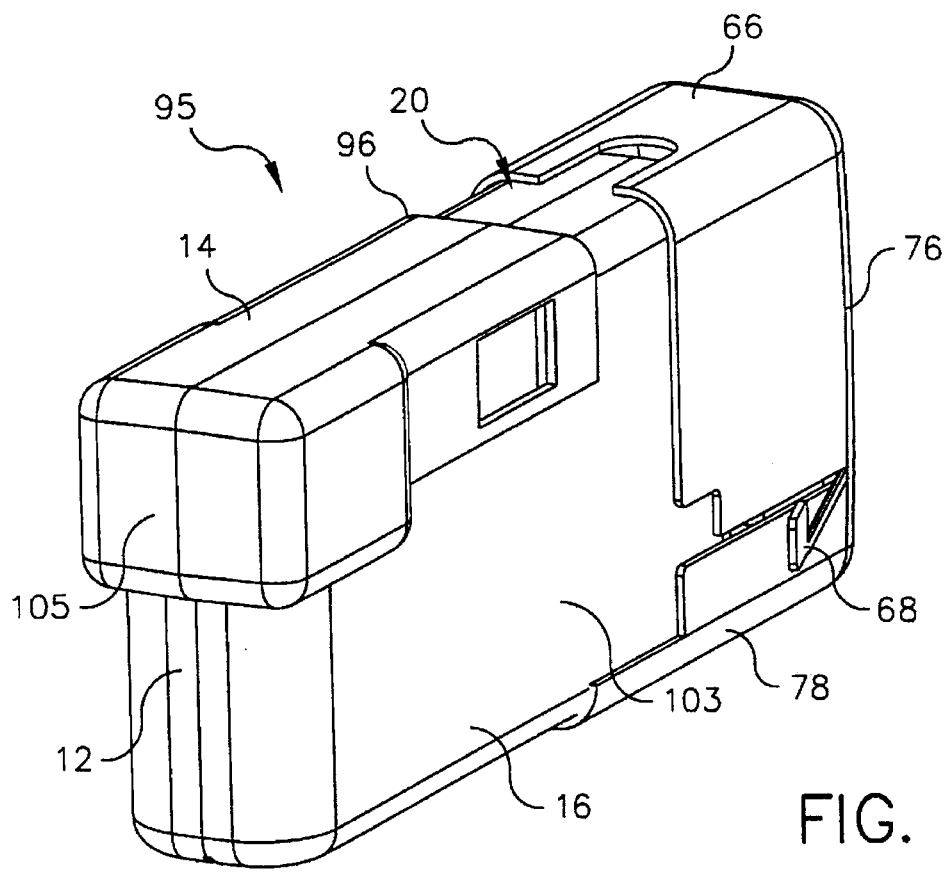
FIG. 16(c) is a rear perspective view of an assembled pump camera showing the removal of the pump cover of FIGS. 16(a) and 16(b) from the camera body.
Figure 16A:
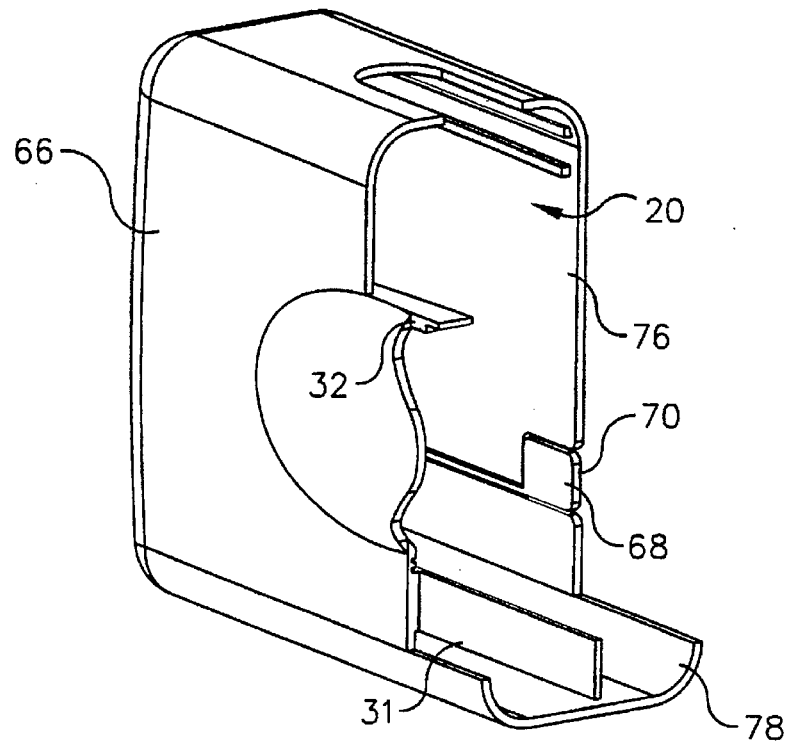
FIG. 16(a) is a side perspective view of a pump cover made in accordance with a fifth embodiment of the present invention.
Figure 16B:
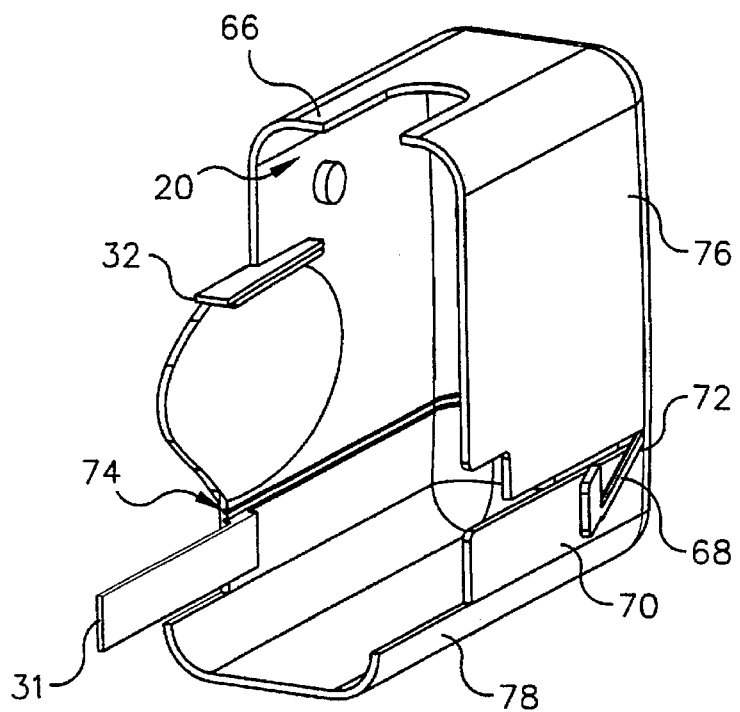
FIG. 16(b) is a rear perspective view of the pump cover of FIG. 16(a)

A sixth embodiment of the present invention is illustrated in FIGS. 16(a)-16(c). As in the preceding embodiments, similar parts are denoted by the same reference numerals for the sake of clarity.

Referring to FIGS. 16(a) and 16(b), the assembled camera 95, FIG. 16(c), of this embodiment includes a pump cover 66 similar to those previously described; that is, having an interior recess and an open end 20 to overlap the assembled front and rear covers 14, 16 of the camera body portion 12, as well as an engagement arm 32 and a guide member 31, each extending from the open end 20 for engagement with the camera body portion as detailed in the previously referred to and cross-referenced patent applications (Attorney Dockets 72240 and 73155 respectively).

The pump cover 66 according to this embodiment is made up of an upper cover section 76 and a lower cover section 78 which are separated by a pull-away tab section 68 which wraps about the periphery of the pump cover with the exception of the open end 20. The pull-away tab section 68 includes a breakaway end 70 and a peripheral pull-away strip 72 within a groove 74 of the cover 66 which is a molded in feature.

Referring to FIGS. 16(a)-16(c), and in operation, removal of the pull-away tab section 68 is initiated by first bending the breakaway end 70 away from the camera body portion 12 and then pulling the strip 72 around the perimeter of the pump cover. The removal of the pullaway tab section 68 releases the unconstrained top portion 76 of the cover 66 from the remainder of the cover and also from the camera body 12, as shown in FIG. 16(c). The lower portion 78 of the cover 66 is therefore also removable from the remainder of the camera 95.

It should be readily apparent that separation of the cover 66 into the upper and lower sections 76, 78, renders the cover unusable.

The invention has been described with reference to a preferred embodiment. However, it will be appreciated that variations and modifications can be effected by a person of ordinary skill in the art without departing from the scope of the invention.

PARTS LIST FOR FIGS. 1–19

10 camera
11 viewfinder
12 body
13 taking lens
14 front cover
15 electronic flash assembly
16 rear cover
17 bottom surface—camera body
18 pump cover
19 interior recess
20 open end
21 bottom surface—pump cover
22 tab portion
23 end of tab portion
24 vertical projection
25 peripheral groove
26 stop surface
27 arrow
28 front surface—pump cover
29 tool engagement hole
30 guide groove
31 guide arm
32 engagement arm
34 end surface
36 stop surface
40 breakable tab portion
42 breakaway insets
44 arrow
46 projecting locking tab
48 bendable guide portion
50 peripheral groove
51 hinged end
52 stop surface
54 longitudinal groove
55 arrow
56 pump cover
58 front half section
60 rear half section
62 releasable snap hook sections
64 end grooves
65 camera
66 pump cover
67 pump cover
68 pull-away tab section
69 camera body portion
70 breakaway end
72 strip
74 groove
75 camera
76 top portion
77 camera body portion
78 bottom portion
79 pump cover
80 guide member
81 taking lens opening
82 ramped projecting tab
84 stop surface
86 rectangular slot
87 locking portion
88 cantilevered end
90 hinged end
92 arrow
94 inward direction arrow
95 camera
96 stop surface—camera body
98 arrow

I claim:

1. A camera comprising:
a body;
a cover having an interior recess sized for receiving an end of said body, said cover being coupled to said body and movable in opposing directions between an opened position and a closed position, said cover including at least one open end to allow removal from said body by movement of said cover in one of said opposing directions; and
a tab extending from the interior of said cover, said tab having a projecting surface for engaging a slot of said body, said tab preventing said cover from movement in one of the opposing directions beyond the opened position, said tab including a plurality of breakaway insets to allow said tab to be removed from said cover and said cover to be removed from said body.

2. A camera comprising:
a body; and
a cover having an interior recess sized for receiving an end of said body, said cover being coupled to said body and movable in opposing directions between an opened position and a closed position, said cover being made from a pair of separable sections, said separable sections of said cover being attached to one another by a peripheral tab portion, said separable sections including releasable hook means to allow said cover to be separated from said body.

3. A camera comprising:
a body; and
a cover having an interior recess sized for receiving an end of said body, said cover being coupled to said body and movable in opposing directions between an opened position and a closed position, said cover being made from a pair of separable sections, said separable sections of said cover being attached to one another by a peripheral tab portion, said peripheral tab member interconnecting said separable sections, said peripheral tab member including a breakaway end section and a strip-like section which can be peeled to separate said sections.

4. A camera comprising:
a body having a forward portion, a rear portion, and a pair of opposed side ends, said body having a forward-facing taking lens;
a cover having an interior recess sized for receiving one of said side ends and partially overlapping said forward portion and said rear portion of said body, said cover being coupled to said body and being movable in opposing directions toward and away from one of said side ends between an opened position and a closed position, said cover including at least one open end to allow removal of said cover from said body by movement of said cover in one of said opposing directions; and at least one of said body and cover having a tab displaceable relative to the other of said body and cover from a first position wherein said tab prevents movement of said cover in one of said opposing directions beyond said opened position to a second position wherein said tab allows said removal of said cover from said body.

5. A camera according to claim 4, wherein said movement preventing means includes a tab extending from the interior of said cover, said tab having a projecting surface for engaging a slot of said body.

6. A camera according to claim 5, wherein said tab is hinged at one end to allow the projecting surface to be disengaged from said slot and said cover to be moved beyond the opened position.

7. A camera according to claim 5, wherein said tab includes a plurality of breakaway tabs to allow said tab to be removed from said cover, wherein removal of said tab allows said cover to be moved beyond the opened position to allow removal of the cover from said body.

8. A camera according to claim 4, wherein said cover is made from a pair of separable sections.

9. A camera according to claim 8, wherein said separable sections of said cover are attached to one another by a peripheral tab portion.

10. A camera according to claim 9, wherein said peripheral tab member interconnects said separable sections, said peripheral tab member including a breakaway end section and a strip-like section which can be peeled to separate said sections.

11. A camera according to claim 8, wherein said separable sections include releasable hook means to allow the cover to be separated from said body.

12. A camera according to claim 4, wherein said cover releasing means non-destructively releases said cover portion from said body.

13. The camera of claim 4 wherein said body is light-tight.

14. The camera of claim 13 wherein said body includes a film advance system and said cover is coupled to said film advance system, said cover operating said film advance system during movement of said cover between one of said open and closed positions and the other of said open and closed positions.

15. The camera of claim 4 wherein said body includes a film advance system and said cover is coupled to said film advance system, said cover operating said film advance system during movement of said cover between one of said open and closed positions and the other of said open and closed positions.

* * * * *